US008943604B2

(12) United States Patent
Muriello et al.

(10) Patent No.: US 8,943,604 B2
(45) Date of Patent: *Jan. 27, 2015

(54) PROVIDING USER CONFIDENCE INFORMATION TO THIRD-PARTY SYSTEMS

(71) Applicant: Facebook, Inc., Menlo Park, CA (US)

(72) Inventors: Daniel Gregory Muriello, Palo Alto, CA (US); Jacob Andrew Brill, San Francisco, CA (US); Siddharth Kar, Palo Alto, CA (US); Alexander Steven Rice, San Francisco, CA (US); Ryan McGeehan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/777,258

(22) Filed: Feb. 26, 2013

(65) Prior Publication Data
US 2013/0247212 A1 Sep. 19, 2013

Related U.S. Application Data

(63) Continuation of application No. 12/876,078, filed on Sep. 3, 2010, now Pat. No. 8,402,548.

(51) Int. Cl.
H04L 29/06 (2006.01)
G06F 21/60 (2013.01)
G06F 21/31 (2013.01)

(52) U.S. Cl.
CPC .............. G06F 21/60 (2013.01); H04L 63/08 (2013.01); G06F 21/31 (2013.01); H04L 63/10 (2013.01); H04L 63/20 (2013.01); G06F 2221/2133 (2013.01)

USPC .......................................... 726/26

(58) Field of Classification Search
CPC .......... G06F 21/60; H04L 63/08; H04L 63/10; H04L 63/20
USPC .......................................... 726/26
See application file for complete search history.

(56) References Cited

U.S. PATENT DOCUMENTS

| 8,166,026 | B1* | 4/2012 | Sadler | 707/725 |
|---|---|---|---|---|
| 2006/0059183 | A1* | 3/2006 | Pearson et al. | 707/101 |
| 2007/0162458 | A1* | 7/2007 | Fasciano | 707/10 |
| 2008/0189768 | A1* | 8/2008 | Callahan et al. | 726/4 |
| 2009/0024971 | A1* | 1/2009 | Willner et al. | 716/5 |
| 2009/0049525 | A1* | 2/2009 | D'Angelo et al. | 726/4 |
| 2009/0178125 | A1* | 7/2009 | Barber et al. | 726/6 |
| 2009/0198575 | A1* | 8/2009 | Kapila | 705/14 |
| 2009/0265639 | A1* | 10/2009 | Shuster | 715/747 |
| 2009/0300097 | A1* | 12/2009 | Meyer | 709/203 |

(Continued)

Primary Examiner — Michael S McNally
(74) Attorney, Agent, or Firm — Fenwick & West LLP

(57) ABSTRACT

An online services system includes a mechanism for providing user confidence information to an external data consumer, and for determining user contribution quality. Using stored information about user actions and interactions, user confidence is evaluated for one or more parameters associated with the validity of the user's account and/or quality of the user's contributions to the online services system. Confidence values are assigned to each parameter, and the values are exposed to external data consumers. Using stored information, user actions and interactions are correlated with contribution quality to produce a metric indicative of user contribution quality. Users with low quality parameter metrics may have their contributions shown to a smaller audience or have a lower prominence in a news feed.

17 Claims, 6 Drawing Sheets

(56) References Cited

U.S. PATENT DOCUMENTS

| | | | |
|---|---|---|---|
| 2010/0250676 A1* | 9/2010 | Ufford et al. | 709/204 |
| 2012/0030027 A1* | 2/2012 | Nomula | 705/14.66 |
| 2012/0047560 A1* | 2/2012 | Underwood et al. | 726/4 |

* cited by examiner

PROVIDING USER CONFIDENCE INFORMATION TO THIRD-PARTY SYSTEMS

CROSS-REFERENCE TO RELATED APPLICATIONS

The present application is a continuation of U.S. application Ser. No. 12/876,078, filed on Sep. 3, 2010, which is hereby incorporated by reference in its entirety.

BACKGROUND

This invention relates generally to online services, and in particular to an online services system in which confidence information is generated for users of the system and provided to third parties.

Online services systems such as social networks have become prevalent in recent years because they provide a useful environment in which users can connect to and communicate with other users. Although a variety of different types of online services systems exist, these systems commonly provide mechanisms allowing users to define and interact within their social networks. In this context, a user may be an individual or any other entity, such as a business or other non-person entity. Accordingly, while enabling social communications among friends, an online services system can also be a valuable tool for businesses to engage with potential consumers. Even without a commercial purpose, an online services system may allow other types of entities to spread their message. For example, a non-person entity may set up a page or group that other users can join (or become a "fan" of), which enables the non-person entity to provide a forum to receive and transmit communications to a group of interested users.

As use of social networking systems increases, so does the potential for abuse of the system through machine code written to interact with the systems as if they were a user of the system, and users wanting to create multiple accounts to gain advantage in games associated with the online services systems. In addition, further problems are presented by compromised user accounts, stale or expired accounts, or duplicate user identities, to name just a few. Thus, online services systems have put in place various verification schemes for users accounts within the online services system or social network.

For third parties who share users with the online services system, typically independent verification of the users is used to ensure the validity of the user accounts and/or sessions with the third party. Thus, it is important for these entities to ascertain, with a reasonable degree of certainty, whether the user accounts are genuine, unique, and represent real people.

SUMMARY

An online services system provides user confidence information to a third party, which helps the third party ensure the validity of a user account, such that it is a unique account for a real person. The online services system previously has verified the user by various means, including associations with other trusted users, authenticating the user session, issuing challenges such as CAPTCHAs, etc. The third party can leverage the confidence information, thereby ensuring the legitimacy of the user account without subjecting the user to additional security measures.

The online services system receives a request for user confidence information, identifies from the request a user, and provides to the external data consumer a determined value of a confidence evaluation parameter for the user. The confidence evaluation parameter value is determined by analyzing a portion of the social data corresponding to interaction between users of the system, where the portion is social data related to the user and the result of the analysis is the value. The online services system exposes the value, e.g., via an API, to a third party system such as a website. The third party then can use the confidence information about the user's account for their own purposes, such as to authenticate the user at a system controlled by the third party or otherwise grant access to a computing resource provided by the third party.

In one embodiment, a confidence parameter engine is configured to collect the social data, present challenges to users, e.g., to verify that the user is a human and not a script or machine, determine the confidence evaluation parameter values, and store the resulting values.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of an Online Services System Architecture

Figure 1:
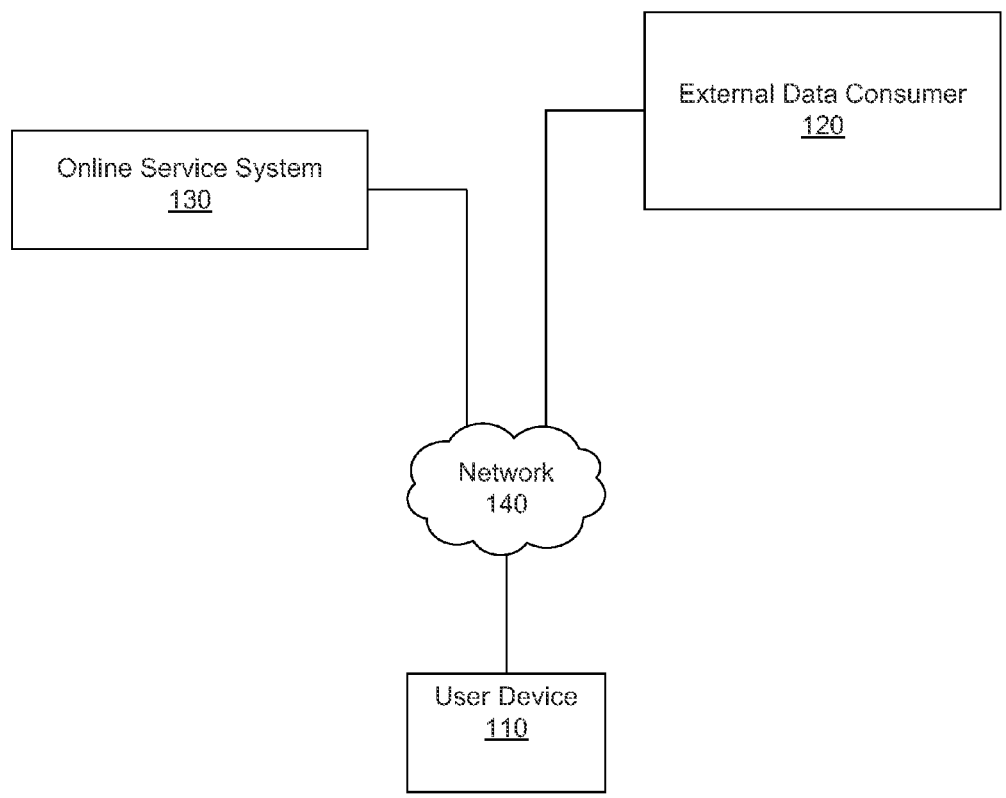
FIG. 1 is a network diagram of one embodiment of a system for providing social network user confidence information to an external data consumer, and for determining user contribution quality.

FIG. 1 is a network diagram of one embodiment of a system 100 for determining information about a user of an online services system 130. According to various embodiments, the information includes user confidence information, which is provided to an external data consumer 120, and a user contribution quality measure, which is used to alter use of the user's contributions by the system. The system 100 includes one or more user devices 110, one or more data consumers 120, the online services system 130, and a network 140. For purposes of illustration, the embodiment of the system 100 shown by FIG. 1 includes a single external data consumer 120 and a single user device 110. However, in other embodiments, the system 100 may include more user devices 110 and/or more data consumers 120. In certain embodiments, the online services system 130 is operated by an online services provider, whereas the external data consumers 120 are separate from the online services system 130 in that they may be operated by different entities. In other embodiments, however, the online services system 130 and the external data consumer 120 operate in conjunction to provide online services to users of the online services system 130. In this sense, the online services system 130 provides a platform, or backbone, which other systems, such as external data consumer 120, may use to provide online services and functionalities to users across the Internet, including but not limited to social networking.

A user device 110 comprises one or more computing devices that can receive input from a user and can transmit and receive data via the network 140. For example, the user device 110 may be a desktop computer, a laptop computer, a smart phone, a personal digital assistant (PDAs), or any other device including computing functionality and data communication capabilities. The user device 110 is configured to communicate with the external data consumer 120 and the online services system 130 via the network 140, which may comprise any combination of local area and/or wide area networks, using both wired and wireless communication systems.

An external data consumer 120 may communicate or share data, information, or services with client devices 110, the online services system 130 via the network 140 responsive to requests by a client device 110, or by the online services system 130. Applications that may be provided by the external data consumer 120 include applications for online sales, online auctions, gift giving, meetings, event management, discussion boards, or other applications that provide data or other information to a client device 110 through the network 140.

In one embodiment, the online services system 130 is a social networking system including one or more computing devices storing a social network of users and providing the users of the social network with the ability to communicate and interact with other users of the social network. In other embodiments, the online services system 130 provides other online services, and is not a provider of social networking services, or provides services not limited to social networking. The online services system 130 is further described below in conjunction with FIG. 2. In use, users join the online services system 130 and may be connected to a number of other users of the online services system 130 to whom they desire to be connected. As used herein, the term "friend" refers to any other user of the online services system 130 to whom a user has formed a connection, association, or relationship via the online services system 130.

Connections may be added explicitly by a user or may be automatically created by the online services system 130 based on common characteristics of the users (e.g., users who are alumni of the same educational institution). For example, a first user specifically selects a particular other user to be a friend. Connections in the online services system 130 are usually in both directions, but need not be, so the terms "user" and "friend" depend on the frame of reference. Connections between users of the online services system 130 are usually bilateral, or "mutual," but connections may also be unilateral, or "one-way." For example, if Bob and Joe are both users of the online services system 130 and connected to each other, Bob and Joe share each other's connections. If, on the other hand, Bob wishes to connect to Joe to view data communicated to the online services system by Joe but Joe does not wish to form a mutual connection, a unilateral connection may be established. The connection between users may be a direct connection; however, some embodiments of the online services system 130 allow the connection to be indirect via one or more levels of connections or degrees or separation.

In addition to establishing and maintaining connections between users and allowing interactions between users, the online services system 130 provides users with the ability to take actions on various types of items supported by the online services system 130. These items may include groups or networks (where "networks" here refer not to physical communication networks, but rather social networks of people, entities, and concepts) to which users of the online services system may belong, events or calendar entries in which a user might be interested, computer-based applications that a user may use via the online services system 130, transactions that allow users to buy or sell items via the service, and interactions with advertisements that a user may perform on or off the online services system 130. These are just a few examples of user interactions in an online services system that includes social networking, and many others are possible. A user may interact with anything that is capable of being represented in the online services system 130 or in an external data consumer 120, separate from the online services system 130, coupled to the online services system 130 via a network 140. In use, stored information about user interactions may be used to determine various metrics corresponding to the users of the online services system 130 and their behavior.

The online services system 130 also is capable of linking a variety of entities. For example, the online services system 130 enables users to interact with each other as well as external data consumers 120 or other entities through an API or other communication channels as described further herein.

The online services system 130 also includes user-generated content, also referred to herein as user contributions, which content enhances a user's interactions with the online services system 130. User-generated content may include anything a user can add, upload, send, or "post," to the online services system 130. For example, a user communicates posts to the online services system 130 from a user device 110. Posts may include data such as status updates, comments, or other text-based data, location information, photos, videos, links, and music, and may include actions in response to user contributions, such as "likes," comments, and reposts, or other similar data and/or media posts. Content also may be added to the online services system 130 by a third-party through a "communication channel," such as a newsfeed or stream. Content "items" represent single pieces of content that are represented as objects in the online services system 130. In this way, users of the online services system 130 are encouraged to communicate with each other by posting text and content items of various types of media through various communication channels, increasing the interaction of users with each other and increasing the frequency with which users interact with the online services system 130.

Figure 2:
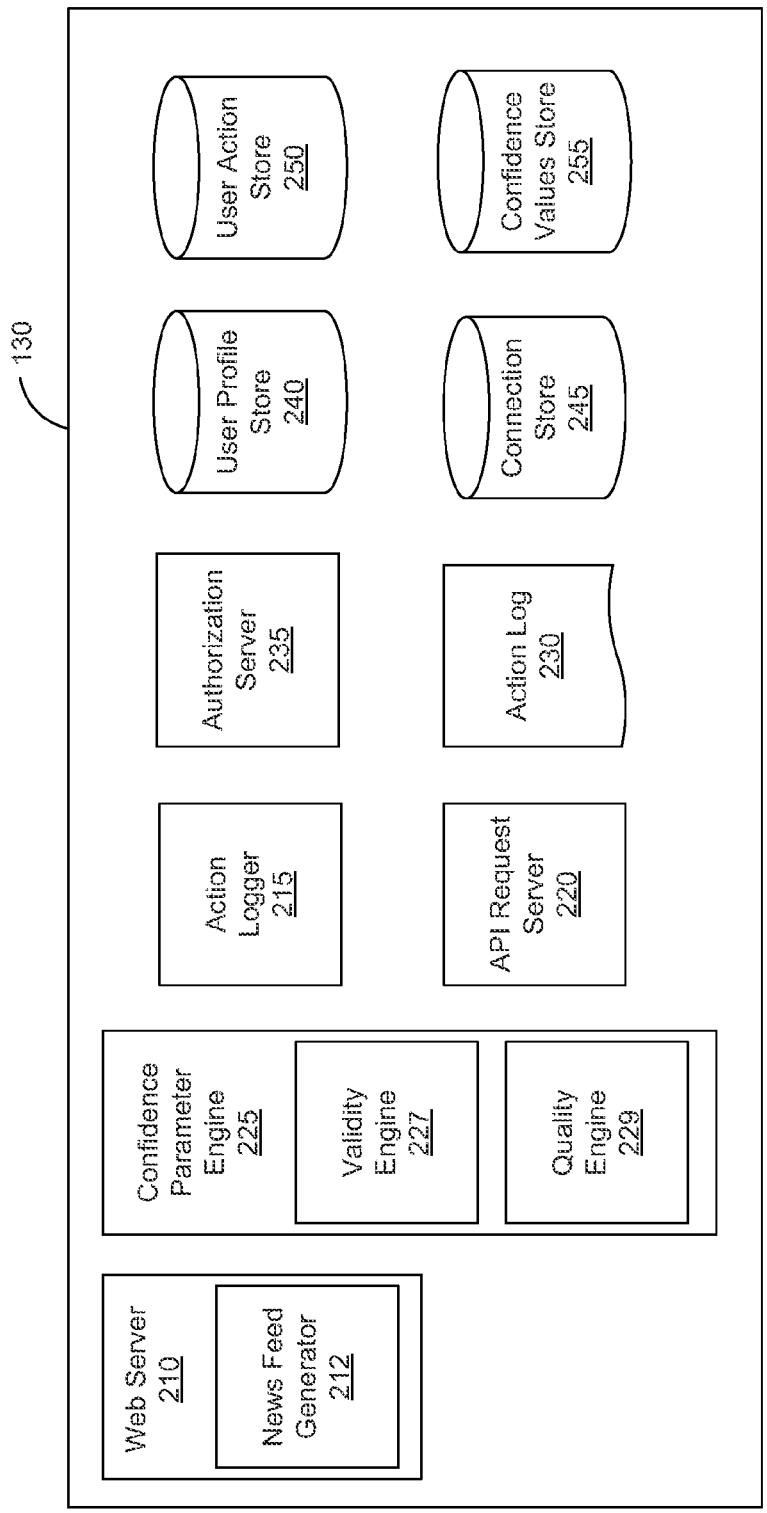
FIG. 2 is a diagram of one embodiment of an online services system.

FIG. 2 is a diagram of one embodiment of an online services system 130. The embodiment of an online services system 130 shown by FIG. 2 includes a web server 210, an action logger 215, an API request server 220, a confidence parameter engine 225, an action log 230, an authorization server 235, a user profile store 240, a connection store 245, a user action store 250, and a confidence values store 255. In other embodiments, the online services system 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the online services system 130 comprises a computing system that allows users to communicate or otherwise interact with each other and access content as described herein. The online services system 130 stores user profiles describing the users of online services in the user profile store 240. The user profiles include biographic, demographic, and other types of descriptive information, such as work experience, educational history, hobbies or preferences, location, and the like. In addition, information specific to actions of a particular user are stored in the user store 240. The online services system 130 further stores data describing one or more connections between different users in the connection store 245. The connection information may indicate users who have similar or common work experience, group memberships, hobbies, or educational history. Additionally, the online services system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed.

The web server 210 links the online services system 130 to one or more user devices 110 and/or one or more data consumers 120 via the network 140. The web server 210 serves web pages, as well as other web-related content, such as Java, Flash, XML, and so forth. The web server 210 may include a mail server or other messaging functionality for receiving and routing messages between the online services system 130 and one or more user devices 110. The messages can be instant messages, queued messages (e.g., email), text and SMS messages, or any other suitable messaging format.

The web server 210 includes, in one embodiment, a news feed generator 212 for a user comprising one or more stories, based on the content of the user stores 240, 250 associated with a particular user. A story is a message that summarizes, condenses, or abstracts one or more of actions of the user from the user's stores 240, 250. The generated news feed stories can then be transmitted to one or more related users—e.g., the user's friends—allowing the user's actions to be shared with such related users. The news feed generator 212 applies an affinity algorithm to the contents of the user profile store 240 accounting for a user's relationships with other users or groups as specified in the connection store 245. By accounting for the user relationships with other users and/or groups, the news feed generator 212 determines data from the user store 240 most relevant to other related users.

In one embodiment, the news feed generator 212 gathers user actions occurring over a selected past interval and generates a story based upon the actions. In another embodiment, the news feed generator 212 can adjust the number, depth, and breadth of stories created by the user in response to an event. For example, if the user is suspected of having a duplicate account, or is otherwise untrusted by the online services system 130, e.g., because the user has a low confidence evaluation parameter metric, the user can be flagged and their stories and actions displayed less prominently or to a smaller audience. In this respect, the news feed generator 212 may work in conjunction with the confidence parameter engine 225 to determine the appropriate prominence of a story for a given user, as described in greater detail below in conjunction with confidence parameter engine 225.

The action logger 215 is capable of receiving communications from the web server 210 about user actions on and/or off the online services system 130. The action logger 215 populates the action log 230 with information about user actions, allowing the online services system 130 to track various actions taken by its users within the online services system 130 and outside of the online services system 130. Any interaction that a particular user takes with respect to another user is associated with each user's profile, through information maintained in the action log 230 or in a similar database or other data repository. Examples of actions taken by a user within the online services system 130 that are identified and stored may include, for example, adding a connection to another user, sending a message to another user, reading a message from another user, viewing content associated with another user, attending an event posted by another user, commenting on or liking a user's post, or any other actions involving interacting with another user or the user's content.

When a user takes an action within the online services system 130, the action is recorded in an action log 230. In one embodiment, the online services system 130 maintains the action log 230 as a database of entries. When an action is taken within the online services system 130, an entry for the action is added to the action log 230.

Additionally, user actions may be associated with an entity outside of the online services system 130, such as external data consumer 120 that is separate from the online services system 130. For example, the action logger 215 receives data describing a user's interaction with an external data consumer 120 from the web server 210. Examples of actions where a user interacts with an external data consumer 120 include a user expressing an interest in an external data consumer 120 or another entity, a user posting a comment to the online services system 130 that discusses an external data consumer 120, a user posting to the online services system 130 a Uniform Resource Locator (URL) or other identifier associated with an external data consumer 120, a user attending an event associated with an external data consumer 120, or any other action by a user that is related to an external data consumer 120. Thus, the action log 230 may include actions describing interactions between an online services system user and an external data consumer 120 that is separate from the online services system 130.

The Application Programming Interface (API) request server 220 allows one or more external data consumers 120 to access information from the online services system 130 by calling one or more APIs. For example, the API request server 220 may receive requests from an external data consumer 120 regarding profile and/or confidence information for users of the online services system 130. The API request server 220 also may allow data consumers 120 (e.g., in some embodiments external websites) to send information to the online services system by calling APIs. For example, an external data consumer 120 sends an API request to the online services system 130 via the network 140 and the API request server 220 receives the API request. The API request server 220 processes the request by calling an API associated with the API request to generate an appropriate response, which the API request server 220 communicates to the external website 120 via the network 140. For example, responsive to an API request, the API request server 220 collects data associated with a user and communicates the collected data to the external data consumer 120. An example of use of the API request server 220 in this manner is detailed in conjunction with FIG. 4.

The online services system 130 further includes a confidence parameter engine 225 configured to determine values various confidence evaluation parameters for users 110. For example, the values may represent measures of validity of a user account, such as whether a user account is believed to be a unique account for a real person, whether a current user session is trusted, whether a user account has ever been compromised (e.g., via a stolen password by an online attacker), and/or whether the user has been issued and overcome a challenge. In addition, the values may represent measures of the quality of the user's contributions to the system 130, e.g., based on feedback by other users of the online services system 130. The confidence parameter engine 225 retrieves social data collected from user interactions between users of the online services system 130, e.g., from the action log 230, user stores 240, 250, and connection store 245 for determining a value for a confidence evaluation parameter for a user based on an analysis of a portion of the social data related to the individual user. The confidence parameter engine 225 analyzes the user data, e.g., using a machine learning algorithm or a rules-based model, and can initiate actions to create additional user data, such as presenting challenges to users, e.g., to verify that the user is a human and not a script or machine. The confidence parameter engine 225 assigns values the parameters and stores the results of the analyses and the values in the confidence values store 255. According to one embodiment, the confidence parameter engine 225 contains logic for determining user confidence information according to the method of the present invention, and is one means for so doing. According to another embodiment, the confidence parameter engine 225 contains logic (working in conjunction with quality engine 229) for determining the quality of a user's contributions in an online service information according to the method of the present invention, and is one means of so doing.

In one embodiment, the confidence parameter engine 225 includes a validity engine 227 and a quality engine 229 for determining confidence evaluation parameters for measurable aspects of user accounts and activities pertaining to the validity of an account and/or the quality of a user's contributions. For example, confidence evaluation parameters associated with a measure of validity of a user account may include whether a user is "trusted" or is of an approved status, validity of specific user sessions, whether the user account has been compromised in the past, whether the user has overcome challenges, length of time since the account was used, resemblance to other account, and other aspects relating to whether the user is a valid user of the online services system 130. For example, a measure of validity for a user account is whether the account is indicative of a unique account for a real person according to one embodiment, i.e., as opposed to an account for a fictitious name or one of multiple accounts for a single user set up for the purpose of games and the like associated with the online services system 130. The validity engine 227 may measure these parameters and store result values to the confidence values store 255. Quality contribution parameters may include the frequency of user postings, likes, and/or comments on others' posts, how often the users' posts or comments are liked or commented on, frequency at which the user's posts are shared or reposted, whether comments are positive or negative in nature and/or associated with an affinity group, percentages of user content that is liked or commented on, percentage of other users associated with the user who comment on the user's posts or comments, and any other means for ascertaining whether the content contributed by the user is quality content. The quality engine 229 may measure these parameters and store result values to the confidence values store 255.

The validity engine 227 analyzes user accounts and activities pertaining to the validity of an account according to one embodiment based on interactions between approved users and non-approved users within the online services system 130 (e.g., receiving/accepting an invitations between the non-approved user and approved users, tagging a photo/confirming a photo tag of the non-approved user, posting a message or poking the non-approved user, etc.).

The validity engine 227 is configured to determine trust values and/or flags for users, which may be used, for example, to determine if the user is an approved user or a non-approved user, to determine a trust level for a non-approved user, and to determine whether to promote the non-approved user to the status of approved user. For example, the validity engine 227 may assign different trust values to different interaction types, and may increment or decrement the values based on the number of interactions with approved users, the interactions themselves, etc. The validity engine 227 then can assign a trust level based on the trust values, and may base approved user status on the trust level according to one embodiment, e.g., for trust levels above a given threshold.

The validity engine 227 also may issue challenges to users and may determine whether a challenge should be presented, e.g., to confirm that the user is a human and the session is valid rather than a script or program running, based on the user's response to the challenge. Whether to issue a challenge also may be based on the trust values or level. One form of challenge is a Completely Automated Public Turing test to tell Computers and Humans Apart (CAPTCHA). A common type of CAPTCHA requires that the user respond to the challenge by typing the letters of a distorted image, sometimes with the addition of an obscured sequence of letters or digits that appears on the screen. These CAPTCHAs are known to be easy to answer for a human and difficult to answer for a computer. An alternative form of CAPTCHA is a social CAPTCHA, in which a security question is based on information about the user's connections or interactions in the online services system 130. For example, a social CAPTCHA may be generated by ascertaining user connection information from the user connection store 245 and asking the user to identify an image of one of the user's connections (or friends) in the online services system. The difficulty level of the social CAPTCHA may be adjusted based on a degree of suspicion associated with the session; increasing the difficulty of the social CAPTCHA generally increases the difficulty for unauthorized people, and not for the user.

According to one embodiment the validity engine 227 also may verify the user via personal information. For example, using a telephone number of a non-approved user, a message containing text, audio, images, video, etc., is sent to a device coupled to the telephone number. The validity engine 227 receives a response from the non-approved user and determines whether the response meets one or more predetermined criteria. Other forms of personal information may be received by the validity engine 227, e.g., physical mailing address, a trusted email address, and so forth. In other embodiments, the validity engine 227 may use additional, fewer, or different account validity verification methods for various applications.

The quality engine 229 analyzes user accounts and activities pertaining to the quality of a user's contributions in the online services system 130. The quality engine 229 is used to predict future contribution quality by any given user according to one embodiment. The quality engine 229 analyses operate on the assumption that certain actions are more or less indicative of quality contributions. For example, a user for whom a very high percentage of status updates receive comments from at least five people is likely a user who contributes high quality content. A non-exhaustive list of user activities and interactions that can be assessed to determine user contribution quality include the users' direct contributions (e.g., status updates, comments on other user content, pokes, likes, posted items, re-posting of other user's contributions, etc.); indirect assessment of user contributions based on other users' behavior (e.g., number of likes and/or comments on user's contributions, frequency of sharing/re-posting user's content, number of messages sent related to the user contribution, positive/negative slant of other user comments, etc.);

and qualitative assessment of user contributions (e.g., percentage of user's posts that get at least one like or comment, percent of user's contacts that like/comment on user's posts, frequency/length/type of user contributions, levels of contributions (e.g., comment/like on a comment), whether contribution are tied to an affinity group, etc.).

The quality engine 229 can determine the likely future quality of contributions by a user based on analysis of the past contributions by the user. The past contributions can be analyzed and various calculations can be made from the analysis.

In some embodiments, a machine learning algorithm can be used. Various social data are input as signals and analyzed by the machine learning algorithm. The machine learning algorithm can be trained on a set of signals associated with social data from a user who has already been verified as contributing quality content. Once the machine learning algorithm has been trained on a known data set, the algorithm can be used for determining whether other users are likely to contribute quality content. For example, the machine learning algorithm can receive signals indicating implicit feedback from other users of the online services system 130. Implicit feedback, as used herein, is implicit in the sense that it is distinguished from explicit feedback, e.g., where a user would provide explicit information about their perception of user quality, e.g., in response to a survey regarding a user.

According to various embodiments, the user contributions comprise text-based contributions (e.g., status updates and comments), photographic materials (e.g., images and videos), links, etc., and the interactions by other users of the online service include actions in response to the text-based contributions, photographic materials, links, etc., comments, likes, and reposts of the text-based contributions, viewing the photographic materials, tagging a user in the photographic materials, commenting on the photographic materials, liking the photographic materials, and reposting the photographic materials, viewing the links, commenting on the links, liking the links, and reposting the links. In addition, the quality engine 229 also may take into account known quality of other users interacting with the user's contributions.

From the analyzed actions, the quality engine 229 predicts the likelihood of future quality contributions by the user, and determines confidence values based on individual quality parameters. Users having higher quality values are considered to be more valuable contributors of the online services system 130. In another embodiment, the quality engine 229 analyses are rules based.

The confidence parameter engine 225 uses the confidence values, provided by the validity engine 227 and quality engine 229 or from other sources to provide user confidence information to third parties, such as data consumers 120 via web server 210 or API request server 220.

The confidence parameter engine 225 may, e.g., in conjunction with the API request server 220, provide the confidence values to third parties such as data consumer 120 for various uses by the same. This confidence information may be provided as the result of a request from the third party, alone or in conjunction with other information about the user, e.g., from the user profile store 240. In one embodiment, the online services system 130 may allow users to control whether the confidence information can be shared with third parties. In other embodiments, users cannot control whether the confidence information is shared, as the confidence information need not include any personal information about the user.

The authorization server 235 enforces one or more privacy settings of the users of the online services system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external data consumers 120 or any entity that potentially can access the information. The information that can be shared by a user comprises user profile information like profile photo, phone numbers associated with the user, user's connections, actions taken by the user such as adding a connection, changing user profile information, and the like, as stored in the various user stores 240, 250. In one embodiment, the information for potential sharing includes confidence information stored in the confidence values store 255 as generated by the confidence parameter engine 225.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all connections with other users (friends) of the user, all friends of friends, all applications, all data consumers 120 or all external systems. In one embodiment, the specification of the set of entries comprises an enumeration of entities, for example, the user may provide a list of data consumers 120 that are allowed to access certain information. Another embodiment allows the specification to comprise a set of entities along with exceptions that are not allowed to access the information. For example, a user may allow all data consumers 120 to access the user's work information but specify a list of data consumers 120 that are not allowed to access the work information. Certain embodiments call the list of exceptions that are not allowed to access certain information a block list. External systems, such as data consumers 120, belonging to a block list specified by a user are blocked from accessing the information specified in the privacy setting. Note that the various combinations of granularity of specification of information and the granularity of specification of entities with which information is shared are possible, i.e., all personal information may be shared with friends whereas all work information may be shared with friends of friends.

The authorization server 235 contains logic to determine if certain information associated with a user can be accessed by a user's friends, data consumers 120 and/or other applications and entities. For example, an external data consumer 120 that attempts to access a user's comment about a URL associated with the external data consumer 120 must get authorization from the authorization server 235 to access the user's work phone number. Based on the user's privacy settings, the authorization server 235 determines if another user, an external data consumer 120, an application, or another entity is allowed to access information associated with the user, including information about actions taken by the user. For example, the authorization server 235 uses a users privacy setting to determine if the user's comment about a URL associated with the external data consumer 120 can be accessed by the external data consumer 120. This enables a user's privacy setting to specify which other users, or other entities, are allowed to receive data about the user's actions or other data associated with the user.

Additionally, the online services system 130 maintains data about objects with which a user may interact using the online services system 130. To maintain this data, the user profile store 240 and the connection store 245 store instances of the corresponding type of objects maintained by the online services system 130. Each object type has information fields that are suitable for storing information appropriate to the type of object. For example, the user profile store 240 contains data structures with fields suitable for describing a user's profile. When a new object of a particular type is created, the online services system 130 initializes a new data structure of the corresponding type, assigns a unique object identifier to it, and begins to add data to the object as needed. This might occur, for example, when a user becomes a user of the online services system 130, the online services system 130 generates a new instance of a user profile in the user profile store 240, assigns a unique identifier to the user profile, and begins to populate the fields of the user profile with information provided by the user.

The connection store 245 includes data structures suitable for describing a user's connections to other users, connections to data consumers 120 or connections to other entities. The connection store 245 may also associate a connection type with a user's connections, which may be used in conjunction with the user's privacy setting, as described above, to regulate access to information about the user.

The user action store 250 stores information for each user, based on actions extracted from the action log 230. The user action store 250 includes data from the action log 230 describing user actions, and can include additional data from the user profile store 240 and/or connection store 245 that is associated with or affected by the action, to further annotate or tag the action data. The user action store 250 can organize the action and related data chronologically, allowing the user action store 250 to record the sequence in which actions were performed by the user and allowing easier access to more recent user actions.

The confidence values store 255 stores confidence evaluation parameter values received from the confidence measure engine 225, validity engine 227, and quality engine 229. The confidence values store 255 may be accessed by external data consumers 120 or other third parties commensurate with user's individual privacy policies.

Figure 3:
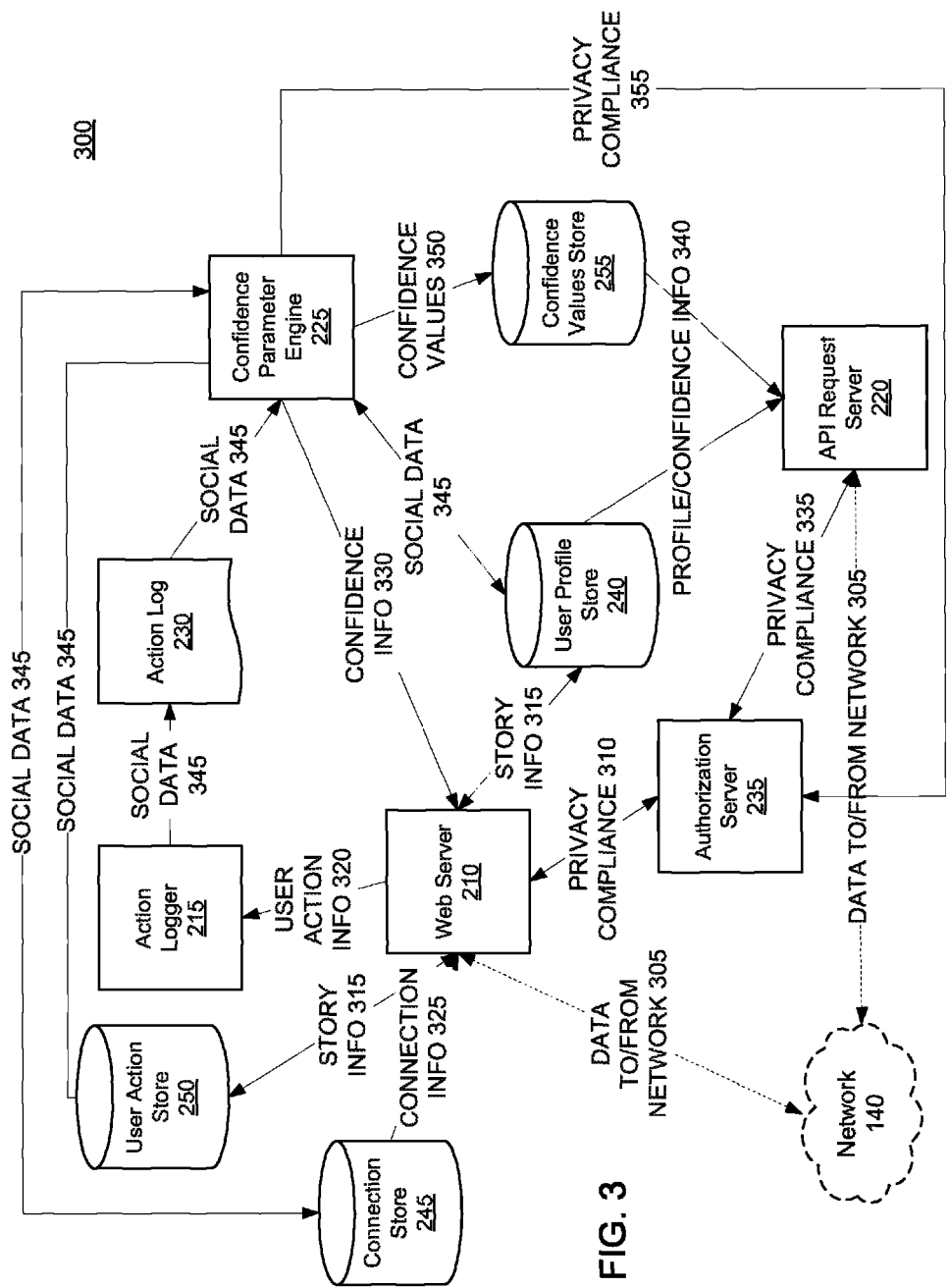
FIG. 3 is data flow diagram showing the flow of data between the internal elements of the online services system according to one embodiment.

FIG. 3 is a data flow diagram showing the flow of data between the internal elements of the online services system 130 according to one embodiment. Two elements of the online services system 130 connect directly to the network 140 (shown as dotted lines since outside of the online services system 130): the web server 220 and the API request server 220. These servers 210, 220 provide the means for connecting the other elements of the online services system 130 with the network 140, and host all data communications 305 between the network 140 and the online services system 130.

The web server 210 is connected 310 to the authorization server 235 to assure that data transmitted from the online services system 130 to the network 140 complies with user privacy settings when relevant to the provided data. The web server 210 is connected 315 to the user stores 240, 250 for providing user information for use in story generation by the news feed generator 212 of the web server 210. The web server 210 is connected 320 to the action logger 215 for providing communications about user actions on and/or off the online services system 130. The web server 210 is connected 325 to the connection store 245 for receiving user connection information for use in generation of news feeds or by external parties. Finally, the web server 210 is connected 330 to the confidence parameter engine 225 for receiving confidence information.

The API request server 220 is connected 335 to the authorization server 235 to assure that any personal information transmitted from the online services system 130 to the network 140 complies with user privacy settings. The API request server 220 is connected 340 to the user profile store 240 and confidence values store 225 for receiving user profile and confidence information for use by external parties.

The confidence parameter engine 225 is connected 345 to the action log 230, user profile store 240, connection store 245, and user action store 250 for retrieval of social data for determining confidence values, and is connected 350 to the confidence values store 255 for storing the confidence values. The social data 345 received from the action log 230 are received from the action logger 215. Finally, the confidence parameter engine 225 is connected 355 to the authorization server 235 to assure that any personal data to be transmitted from the online services system 130 complies with user privacy settings.

Provision of User Confidence Information to an External Data Consumer

The online services system 130 provides user confidence information to a third party, e.g., by way of an application programming interface. The confidence information helps the third party determine the legitimacy of the user without directly subjecting the user to security verification. The online services system 130 receives a request for user information, including confidence information, e.g., from an external data consumer 120, identifies from the request a user, and provides to the external data consumer 120a determined value of a confidence evaluation parameter for the user. Since the user has been verified by the online services system 130, the external data consumer 120 can use the verification in lieu of other security measures, such as presenting CAPTCHAs or using email verification.

Figure 4:
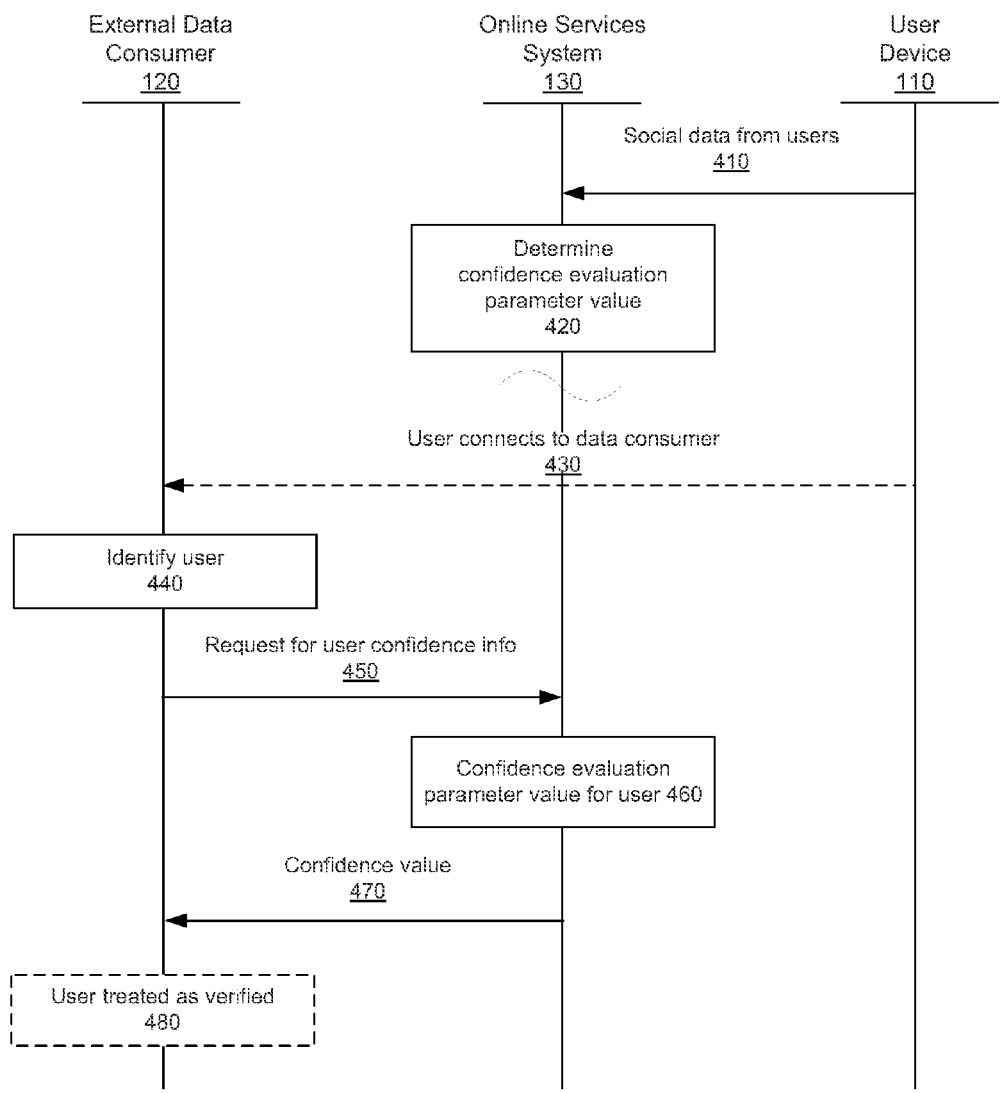
FIG. 4 is an interaction diagram of a process for providing user confidence information to an external data consumer, in accordance with an embodiment of the invention.

FIG. 4 is an interaction diagram of a process for providing confidence information about a user of an online services system 130 to an external data consumer 120, in accordance with an embodiment of the invention. In the embodiment shown, the external data consumer 120 is separate from the online services system 130. The online services system 130 comprises a computing system that allows users to communicate or otherwise interact with each other and access content as described herein.

When a user initially becomes a user of the online services system 130, the online services system 130 generates a new instance of a user profile in the user profile store 240, assigns a unique identifier to the user profile, and begins to populate the fields of the user profile with information provided by the user. As users, such as the user via user device 110, interact with the online services system 130, social data, such as use data, contribution information, and other information about interactions between users of the online services system 130, is collected 410 by the online services system 130. Interactions of users with each other's contributions in the online services system 130 from the user also are received by the online services system. Only one user device 110 is shown in FIG. 4 for simplicity of illustration, but the online services system 130 tracks the interactions of multiple users of the system 130. The social data is stored by the online services system 130 as described in greater detail herein.

Next, the online services system 130 determines 420 one or more confidence evaluation parameter values from the social data. As described elsewhere herein, confidence evaluation parameters may include measures of validity and of quality contributions. Confidence evaluation parameters associated with a measure of validity of a user account may include whether a user is "trusted" or is of an approved status, validity of specific user sessions, whether the user account has been compromised in the past, whether the user has overcome challenges, length of time since the account was used, resemblance to other accounts, and other aspects relating to whether the user is a valid user of the online services system 130. For example, a measure of validity for a user account is whether the account is indicative of a unique account for a real person according to one embodiment, i.e., as opposed to an account for a fictitious name or one of multiple accounts for a single user set up for the purpose of games and the like associated with the online services system 130. Confidence evaluation parameters also may be associated with a measure of quality of a user's contribution, as described further in conjunction with FIG. 6

The online services system 130 may determine 420 the value of the confidence evaluation parameter in various ways according to different embodiments. For example, a machine learning algorithm may be used; in this example, a machine learning algorithm is trained using historical data for the users of the online services system and the collected social data in input into the trained machine learning algorithm to obtain the confidence evaluation parameter value. Alternatively, a rules-based engine may be used that compares the social data for a user to a predetermined condition associated with the confidence evaluation parameter, and the determined value is based upon whether the condition is satisfied. For example, for the confidence evaluation parameter of whether the account have been verified via a challenge, the condition may be correctly inputting the challenge CAPTCHA, and the value for doing so may be yes, or 1. In another embodiment, the social data for the user is compared to established values of the confidence evaluation parameter and the determined value is selected from one of the established values. For example, for the confidence evaluation parameter of whether the account has a history of being compromised, the established values may be never, once, and multiple times, and the determined value selected accordingly for zero times, one time, or greater than one time being compromised. In yet another embodiment, social data for the user is compared to typical user data for the confidence evaluation parameter and the determined value for the user is based upon a degree of similarity to the typical user data. For example, for the confidence evaluation parameter of whether the user provides quality status updates relative to other users, the typical user data may show that one to five other users comment on most status updates by the user, and the user value may be classified as low quality (average less than one comment per status update), average quality (average 1-5 comments), or high quality (average over five comments).

The value of the confidence evaluation parameter for the user is stored by the online services system 130. The online services system 130 includes a confidence parameter engine 225 configured to determine the confidence evaluation parameters values for users of the system 130. As part of the determining process, the confidence parameter engine 225 can initiate actions to create additional user data, such as presenting challenges to users, e.g., to verify that the user is a human and not a script or machine. In one embodiment, a validity engine 227 and a quality engine 229 determine confidence evaluation parameters for measurable aspects of user accounts and activities pertaining to the validity of an account and/or the quality of a user's contributions, respectively.

According to one embodiment, a user connects 430 to the external data consumer 120. For example, the external data consumer 120 may be a third party website and the user may be accessing the website and/or requesting information from the website. The user connection 430 may trigger the external data consumer 120 to identify 440 the user.

Next, the external data consumer 120 requests 450 from the online services system 130 confidence information associated with the user 110. The confidence information may be requested alone, or in conjunction with a request for other information about the user, such as user profile information or a list of the user's connections in the online services system 130. The external data consumer 120 may or may not have information regarding whether the user 110 is a user of the online services system 130. In case the external data consumer 120 does not have information about whether the user 110 is a user of the online services system 130, the external data consumer 120 may also request the status of the user 110 in the online services system 130. If the external data consumer 120 has the information that the user 110 is a user of the online services system 130, the external data consumer 120 may request further information related to user 110 from the online services system 130. According to one embodiment, the external data consumer 120 accesses the user information via an API request server (e.g., 220 of FIG. 2) of the online services system 130, which allows third parties to call one or more APIs, and may also allow external data consumers 120 (e.g., in some embodiments external websites) to send information to the online services system 130 by calling the APIs. For example, an external data consumer 120 sends an API request to the online services system 130 via the network 140 and the API request server 220 receives the API request. The API request server 220 processes the request by calling an API associated with the API request to generate an appropriate response, which the API request server 220 communicates to the external data consumer 120 via the network 140.

As part of the request 450, the external data consumer 120 may present information associated with the user 110 that helps the online services system 130 identify the user as a user of the online services system 130. The information presented by the external data consumer 120 for identifying the user 110 may depend on previous communications between the external data consumer 120 and the online services system 130 regarding the user 110. For example, if the external data consumer 120 has previously communicated with the online services system 130 regarding user 110, the external data consumer 120 may have a unique identifier associated with the user's profile, which may then be used to uniquely identify the user. If this is the first request sent by the external data consumer 120 to the online services system 130 regarding the user 110, the external data consumer 120 may send information useful for identifying the user 110. In one embodiment, the external data consumer 120 may uniquely identify the user 110 by sending information that it maintains for the user 110, such as the user's full name, email address, home phone number, date of birth, or any other identifying information, alone or in combination. In certain embodiments, the external data consumer 120 may compute a hash value based on information useful for identifying the user 110 and send the hash value to the online services system 130. Use of a hash function on the user's unique information beneficially protects the user's privacy and generally enhances the security of the communications between the external data consumer 120 and the online services system 130. In one embodiment, the API server 220 of the online services system 130 may require inputs that identify the user 110 as a user of the online services system 130, e.g., using a user ID.

Based on the identification information provided with the request 450, the online services system 130 retrieves 460 the confidence evaluation parameter value for the user 110. In one embodiment, the steps including and leading up to the request 430-450 take place at some time after the online services system 130 has determined 420 the confidence evaluation parameter value, as indicated by a dashed wavy line between steps 420 and 430. In another embodiment, the determining step 420 may occur as a result of the request, and may replace the retrieval step 460.

Before transmitting 470 the confidence value to the external data consumer 120, a privacy policy for the user may be consulted if private user information is requested 445, to determine whether the personal information can be shared. In some embodiments, the privacy policy is not consulted, e.g., if none of the requested 450 data includes personal information for which privacy settings are used. The value for the confidence evaluation parameter then is provided 470 to the external data consumer 120, alone or in conjunction with other user information. The confidence information aids the external data consumer 120 to determine the legitimacy of the user 110 without directly subjecting the user 110 to security verification. Since the user has been verified by the online services system 130, the external data consumer 120 can treat the user as verified 480 without independent verification.

Figure 5:
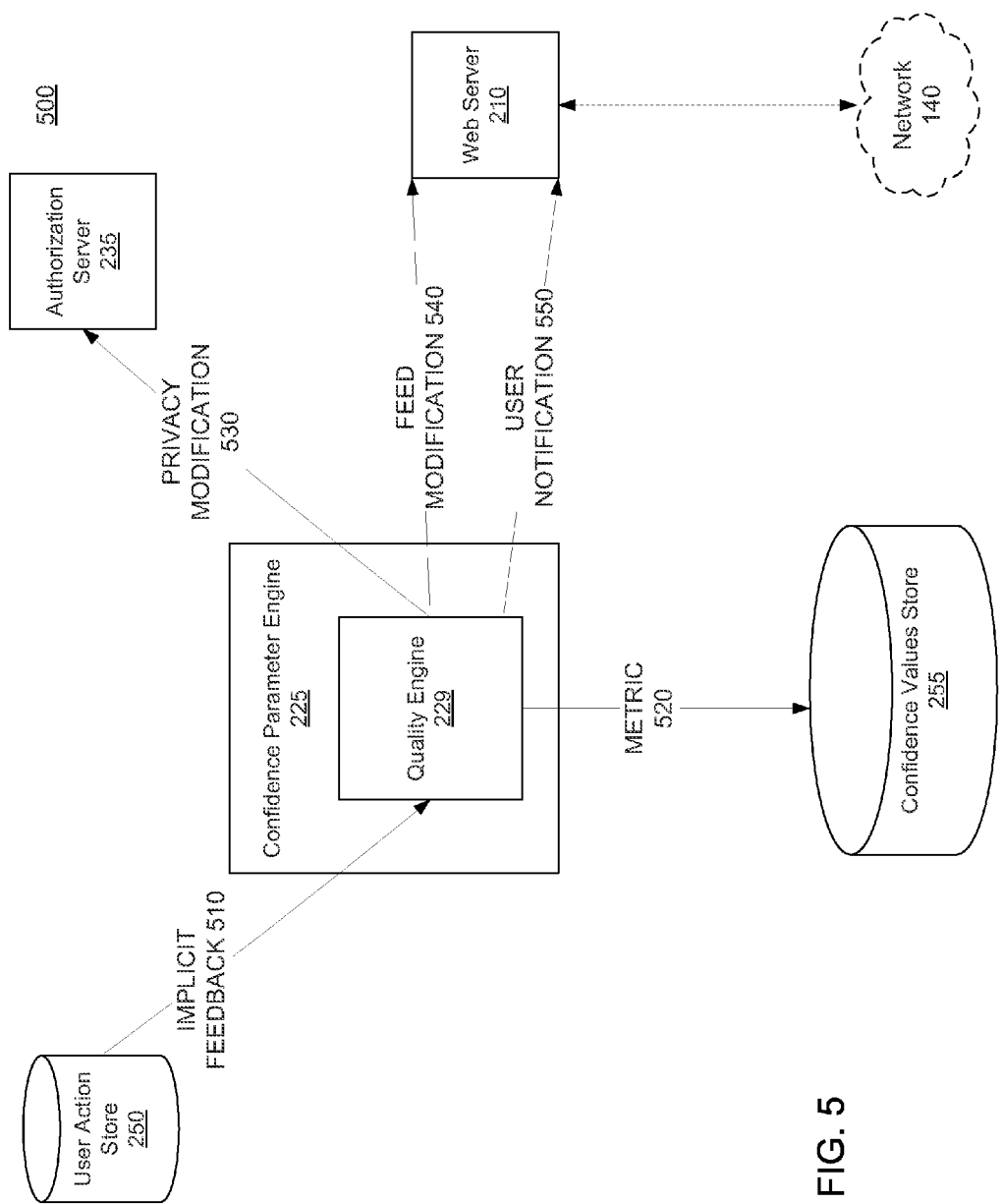
FIG. 5 is a data flow diagram showing the flow of data between the internal elements of the online service system according to one embodiment.

Turning now to using the online services system 130 to determine the quality of a user's contributions to the online services system 130, FIG. 5 is a data flow diagram 500 showing the flow of data between the internal elements of the online service system 130 according to one embodiment.

As shown in FIG. 5, a quality engine 229 of the online services system 130 orchestrates the data flow 500. The quality engine 229 communicates with users 110 via a web server 210 across the network 140 for receiving user contributions to the online services system 130, publishing those contributions to the other users of the service, and for recording interactions of user's with other user's contributions as implicit feedback about the contributing user. The quality engine 229 gathers 510 the implicit feedback from the user action store 250, which feedback originated from users of the online services system 130. The user action store 250 stores information for each user, based on actions extracted from the action log 230. The user action store 250 includes data from the action log 230 describing user actions, and can include additional data from the user profile store 240 and/or connection store 245 that is associated with or affected by the action, to further annotate or tag the action data.

The quality engine 229 also determines a metric indicative of perceived contribution quality of a user's contributions based on the implicit feedback from other users of the online services system 130, and stores 520 the metric to the confidence values store 255. The implicit feedback may be based various factors as described herein, including but not limited to According to various embodiments, the user contributions comprise text-based contributions (e.g., status updates and comments), photographic materials (e.g., images and videos), links, etc., and the interactions by other users of the online service comprise actions in response to the text-based contributions, photographic materials, links, etc., comments, likes, and reposts of the text-based contributions, viewing the photographic materials, tagging a user in the photographic materials, commenting on the photographic materials, liking the photographic materials, and reposting the photographic materials, viewing the links, commenting on the links, liking the links, and reposting the links.

In one embodiment, an optional additional metric may be determined. The additional metric is indicative of contribution quality based on attributes of the contributions themselves, and may be added to calculation of the metric. Example attributes of the user's contributions that may serve as the basis for the third metric include average contributions per unit time (e.g., day, week), average word count per contribution, and the percentage of contributions that are text entries (e.g., comments), or other direct indicators of probable user contribution quality.

In use, the (primary) metric may affect various aspects of the user's interactions with the online services system 130. For example, if the metric indicative of perceived contribution quality is low, e.g., below a predetermined threshold, the quality engine 229 may communicate 530 to the authorization server 235 to alter the user's desired privacy settings. For example, if the user's privacy policy settings as set by the user indicate that the user's contributions (e.g., status updates, comments, etc.) are viewable by everyone, the alteration of the privacy settings may include instead making the user's contributions viewable only to users interacting or otherwise connected to the user ("friends") or keeping them private, instead of exposing to everyone per the user's stated settings.

If the metric indicating confidence in the quality of the user's contributions is low or high, e.g., below or above a predetermined threshold, the quality engine 229 may communicate 540 to the web server 210 (news feed 212) to alter the placement of contributions by the user in news feeds. The news feed generator 212 for a user comprises one or more stories, based on the content of the user stores 240, 250 associated with a particular user. The generated news feed stories can then be transmitted to one or more related users—e.g., the user's friends—allowing the user's actions to be shared with such related users. If the quality metric for a user is below a given threshold, it can be assumed that the user does not provide quality contributions, and the user's contributions can be displayed less prominently (e.g., via position on the news feed page). On the contrary, if the quality metric is high, the user's contributions could take a higher prominence on the news feed page.

In one embodiment, any alteration to the user's privacy settings and/or prominence in news feeds may be communicated 550 to the user 110, e.g., via the web server 210 across the network 140. In other embodiments, the user 110 is not notified 550 of such changes.

Determination of Online Services User Contribution Quality

The online services system 130 uses past contribution quality data to predict future social network user contribution quality. User interactions with a user's contributions are monitored and logged, and the actions are correlated with a contribution quality metric. The interactions may include the frequency of user postings, likes, and/or comments on others' posts, how often the users' posts or comments are liked or commented on, frequency at which the user's posts are shared or reposted, whether comments are positive or negative in nature and/or associated with an affinity group, percentages of user content that is liked or commented on, percentage of other users associated with the user who comment on the user's posts or comments, and any other means for ascertaining whether the content contributed by the user is quality content. In addition, negative interactions also may be included in the quality determination, e.g., a content item deleted by the context owner (e.g., deleted wall post by another user), mark-as-spam actions, etc. The quality engine 229 of the online services system 130 determines the metric from other user interactions with user contributions, thus providing implicit feedback about the quality of the user's contributions.

Figure 6:
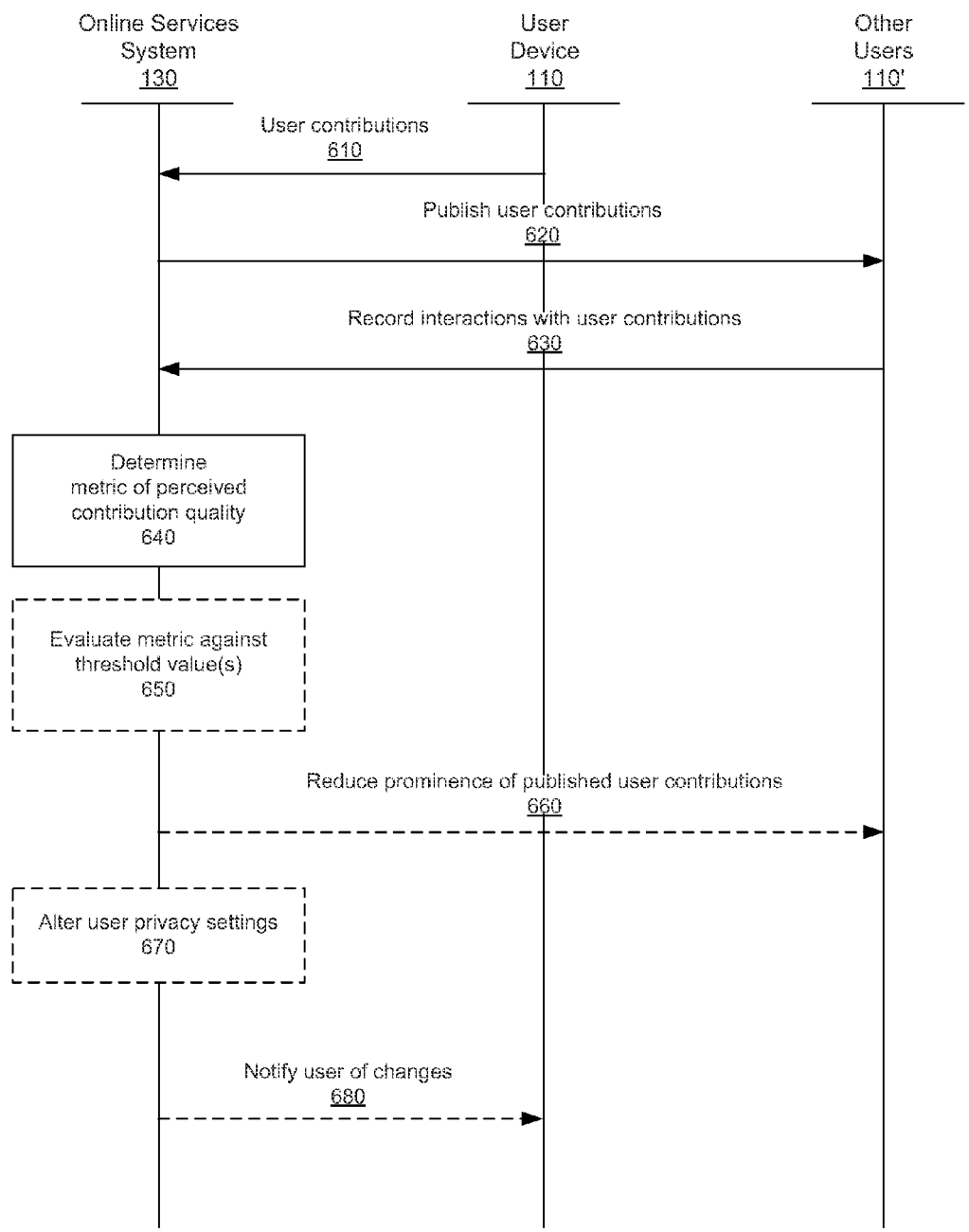
FIG. 6 is an interaction diagram for determining the quality of a user's contributions within an online services system, in accordance with an embodiment of the invention.

FIG. 6 is an interaction diagram 600 for determining the quality of a user's contributions within an online services system 130, in accordance with an embodiment of the invention. The online services system 130 comprises a computing system that allows users to communicate or otherwise interact with each other and access content as described herein.

As part of the user's use of the online services system 130, user contributions are received 610 by the online services system 130 and may be stored, e.g., stored in a user action store 250. Contributions may include text-based contributions such as status updates and comments (either independent or related to other contributions, e.g., a comment on a comment), photographic materials such as videos and still photos, and links, to name a few. This list is meant to be exemplary but not limiting, and any other types of user contributions to an online services system 130 are within the scope of the invention. The user's contributions are published 620 to other users 110' of the online services system 130, e.g., in the form of news feeds, etc. as described herein.

Interactions of users with the contributions of other users are recorded 630 by the online services system 130. Interactions may include, e.g., actions in response to the text-based contributions, photographic materials, links, etc., comments, likes, and reposts of the text-based contributions, viewing the photographic materials, tagging a user in the photographic materials, commenting on the photographic materials, liking the photographic materials, and reposting the photographic materials, viewing the links, commenting on the links, liking the links, and reposting the links. The interactions by other users provide implicit feedback about the quality of the contributions.

The online services system 130 determines 640 from the interactions a metric indicative of perceived contribution quality of the user's contributions, which is stored in the confidence values store 255. As part of this determination, quality metrics for the other users from whom the implicit feedback is obtained is taken into account according to one embodiment. According to another embodiment, an additional metric is determined indicative of quality of the user's contributions themselves based on an analysis of attributes of the user's contributions. For example, the attributes considered may include average number of contributions by the user per unit time, average word count of the contributions by the user, average ratio of alphanumeric to non-alphanumeric characters, and percentage of the contributions by the user that are text-based contributions.

The metric may be determined 640 in a number of different ways. According to one embodiment, a machine learning algorithm is used, in which the algorithm is trained using historical data for users of the online services system and the recorded interactions are input into the trained machine learning algorithm to obtain the metric. In another embodiment, a rules-based model is used, in which the recorded interactions with the user's contributions are compared to a set of rules indicative of perceived contribution quality to determine the metric. In another embodiment, once the metric is determined 640, it is compared to a known average perceived contribution quality value for the other users of the online services system.

In one embodiment, the online services system 130 is a social networking system.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving social data collected from interactions between users of an online services system;
    determining, for a user of the online services system, a value for a confidence evaluation parameter based on an analysis of a portion of the social data related to the user, the portion of social data including interactions of the user with contributions of other users in the online services system; and
    providing to an external data consumer the value for the confidence evaluation parameter determined for the user.

2. The method of claim 1, further comprising:
collecting the social data from the interactions between the users of online services system.

3. The method of claim 1, further comprising:
receiving a request from the external data consumer for the value of the confidence evaluation parameter for the user.

4. The method of claim 1, wherein the confidence evaluation parameter represents a measure of validity of an account associated with the user.

5. The method of claim 4, wherein the measure of validity is whether an account for the user is indicative of a unique account for a real person.

6. The method of claim 4, wherein the measure of validity is whether a current user session is trusted.

7. The method of claim 4, wherein the measure of validity is whether a history of an account associated with the user indicates an incidence of the account having been compromised.

8. The method of claim 4, wherein the measure of validity is determined based in part on whether the user has overcome a challenge issued by the online services system.

9. The method of claim 1, wherein the confidence evaluation parameter represents a measure of quality of contributions by the user.

10. The method of claim 9, wherein the measure of quality is based upon feedback about the contributions by the user from other users of the online services system.

11. The method of claim 10, wherein the feedback about the contributions by the user from the other users comprises implicit feedback about the contributions by the user based on the other user's interactions with the contributions.

12. The method of claim 1, wherein:
the analyzing comprises comparing the social data for the user to a predetermined condition for the confidence evaluation parameter; and
the value assigned to the user corresponds to whether the condition is satisfied.

13. The method of claim 1, wherein:
the analyzing comprises comparing the social data for the user to data constraints for established values of the confidence evaluation parameter; and
the value assigned to the user is selected from one of the established values.

14. The method of claim 1, wherein:
the analyzing comprises comparing the social data for the user to typical user data for the confidence evaluation parameter; and
the value assigned to the user is based upon a degree of similarity to the typical user data for the confidence evaluation parameter.

15. The method of claim 1, wherein the determining of the confidence evaluation parameter further comprises:
training a machine learning algorithm using historical data for the users of the online services system; and
inputting the collected social data into the trained machine learning algorithm to obtain the confidence evaluation parameter.

16. A method comprising:
receiving social data collected from interactions between users of an online services system;
determining, for a user of the online services system, a value for a confidence evaluation parameter based on an analysis of a portion of the social data related to the user, the portion of social data including interactions of the user with contributions of other users in the online services system, wherein the determining of the confidence evaluation parameter further comprises:
training a machine learning algorithm using historical data for the users of the online services system, and
inputting the collected social data into the trained machine learning algorithm to obtain the confidence evaluation parameter; and
receiving a request from the external data consumer for the value of the confidence evaluation parameter for the user; and
providing to an external data consumer the value for the confidence evaluation parameter determined for the user.

17. A method comprising:
receiving social data collected from interactions between users of an online services system;
a step for determining, for a user of the online services system, a value for a confidence evaluation parameter based on an analysis of a portion of the social data related to the user, the portion of social data including interactions of the user with contributions of other users in the online services system; and
providing to an external data consumer the value for the confidence evaluation parameter determined to the user.

* * * * *